UNITED STATES PATENT OFFICE.

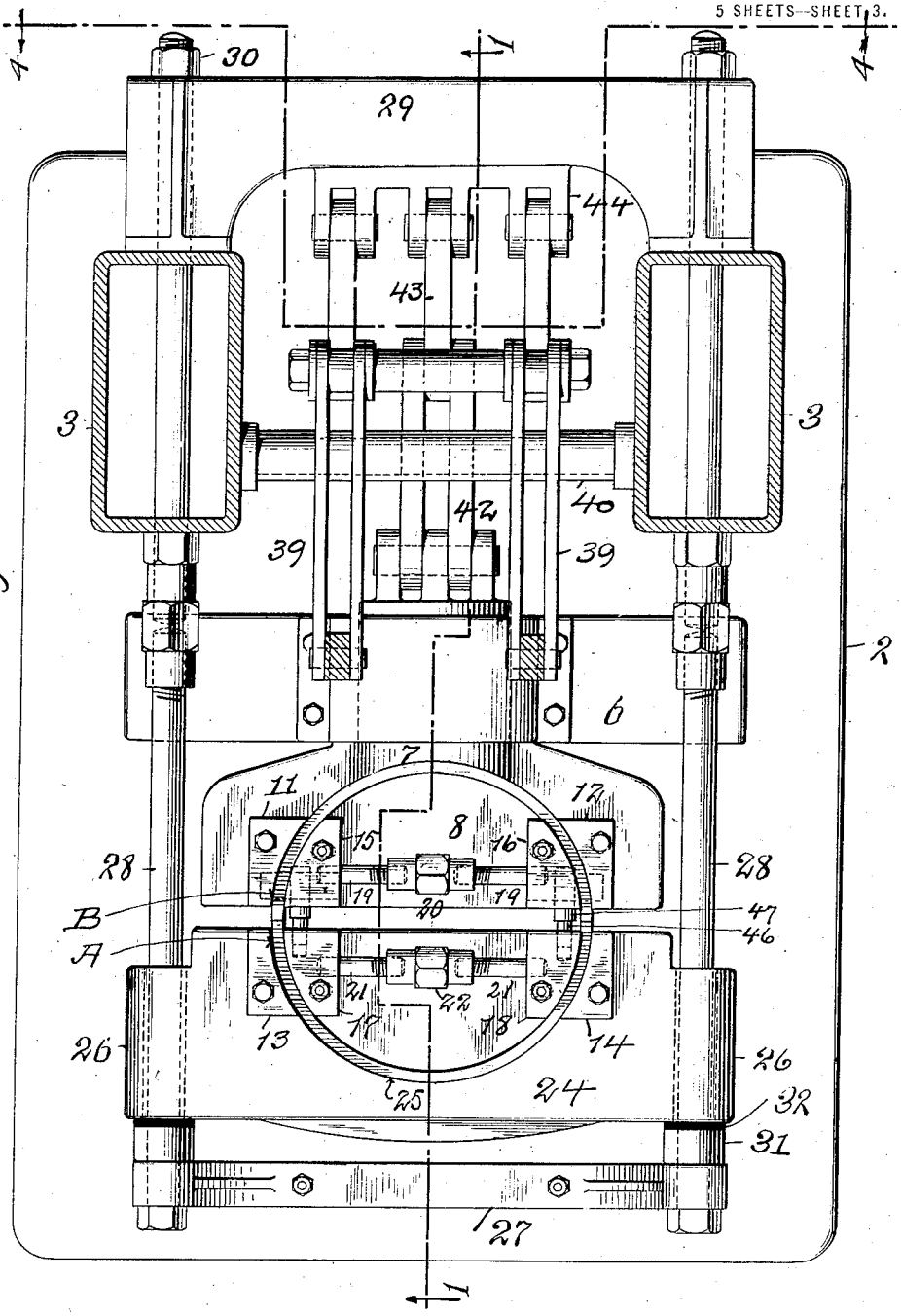

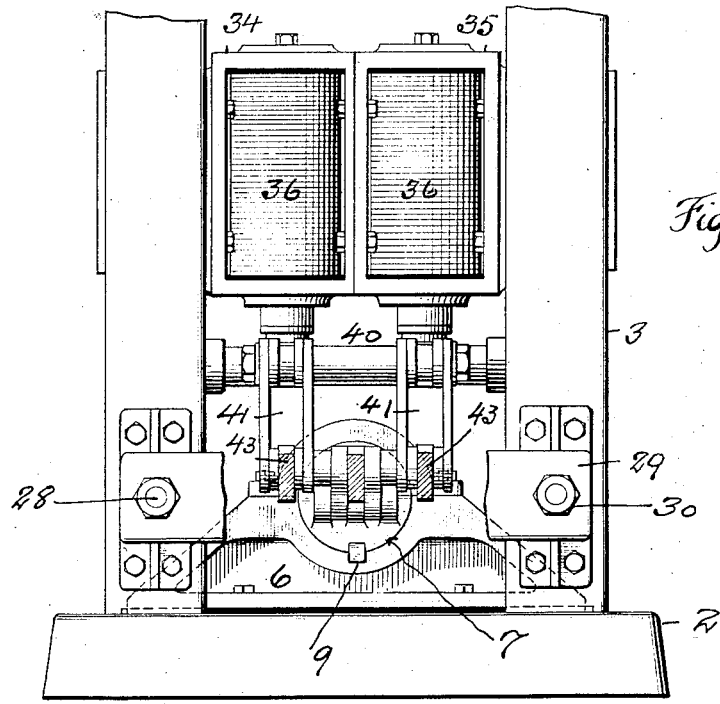
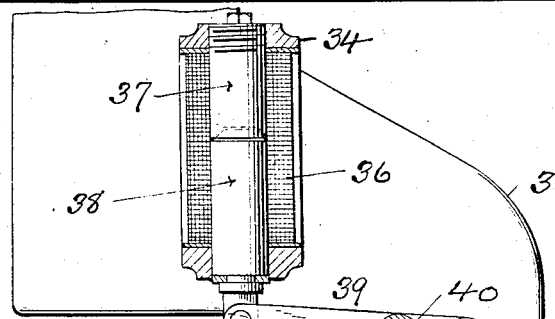
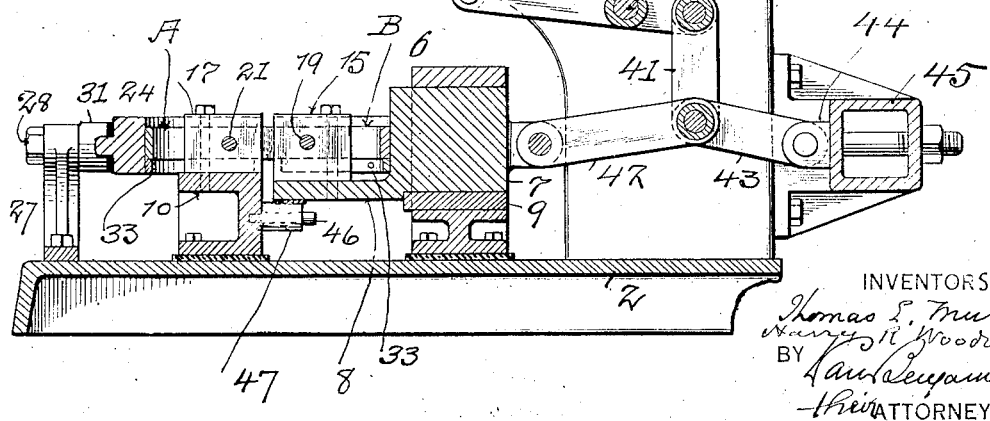

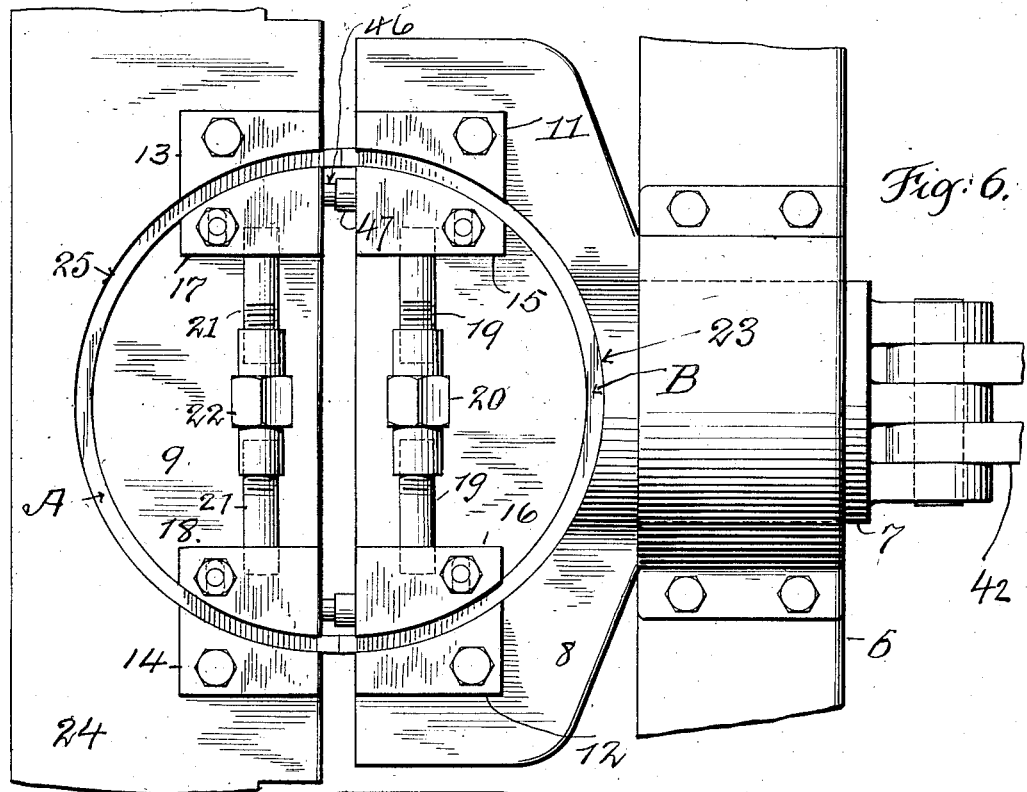
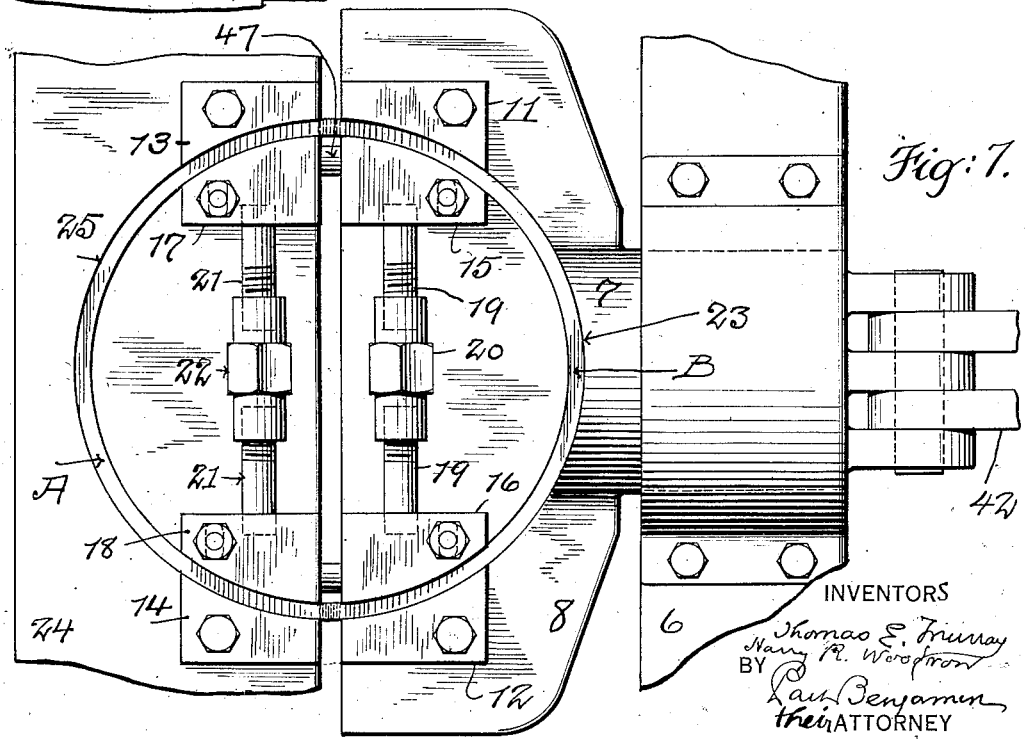

THOMAS E. MURRAY AND HARRY R. WOODROW, OF NEW YORK, N. Y.; SAID WOODROW ASSIGNOR TO SAID MURRAY.

ELECTRIC WELDING-MACHINE FOR MAKING METAL RINGS.

1,267,254.

Specification of Letters Patent.

Patented May 21, 1918.

Application filed December 10, 1917. Serial No. 206,404.

*To all whom it may concern:*

Be it known that we, THOMAS E. MURRAY and HARRY R. WOODROW, citizens of the United States, residing at New York, in the county of New York and State of New York, have invented a certain new and useful Improvement in Electric Welding-Machines for Making Metal Rings, of which the following is a specification.

The invention is an electric welding machine for making metal rings or other endless shapes of metal. The work is formed of half sections, which in the case of a ring are semi-circular, with supplemental end projections. The sections are clamped between electrodes arranged respectively on a fixed and a movable support, with the end projections abutting and in contact. Upon the welding current being established, said end projections become plastic, and power is applied to the movable support to force the sections together, the plastic metal then yielding and becoming extruded at the joint, until a truly circular ring is formed. The invention consists more particularly in the construction hereinafter set forth.

In the accompanying drawings—

Figure 1:
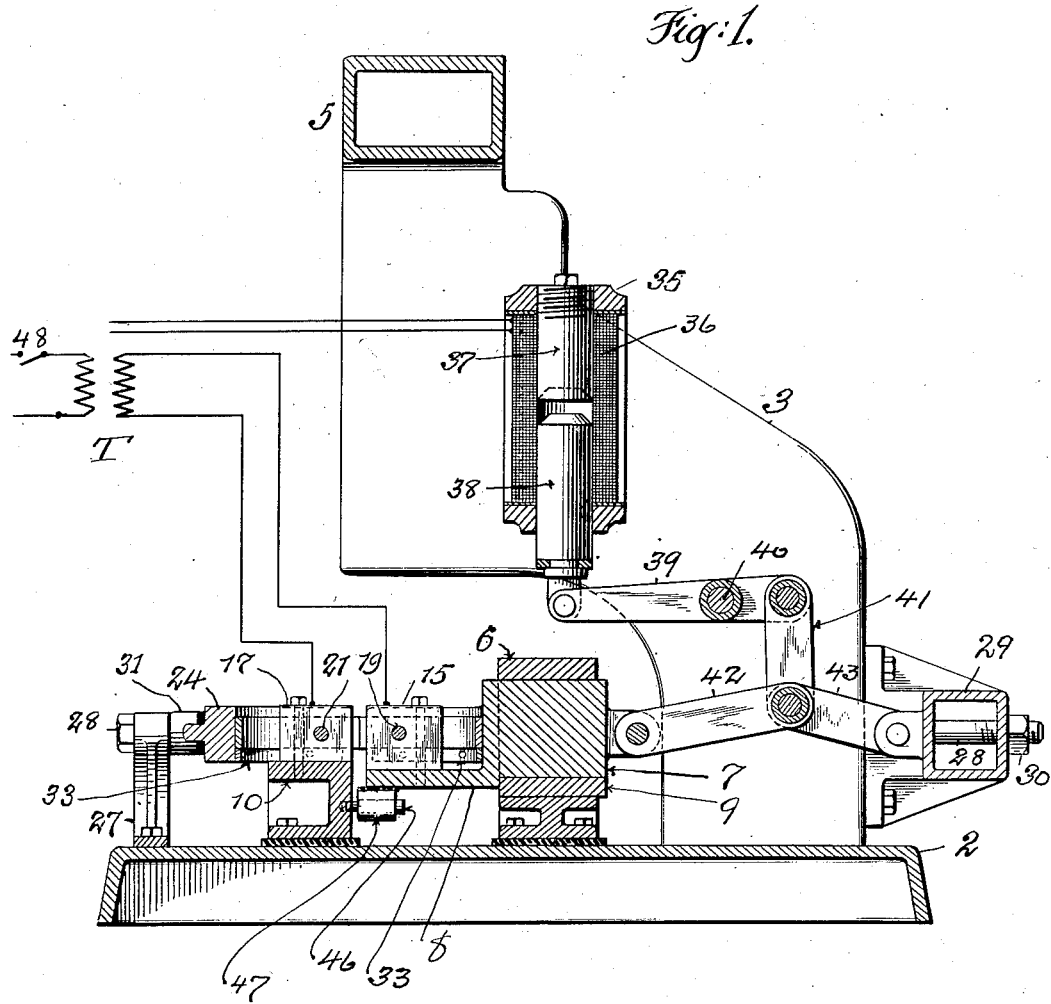
Figure 2:
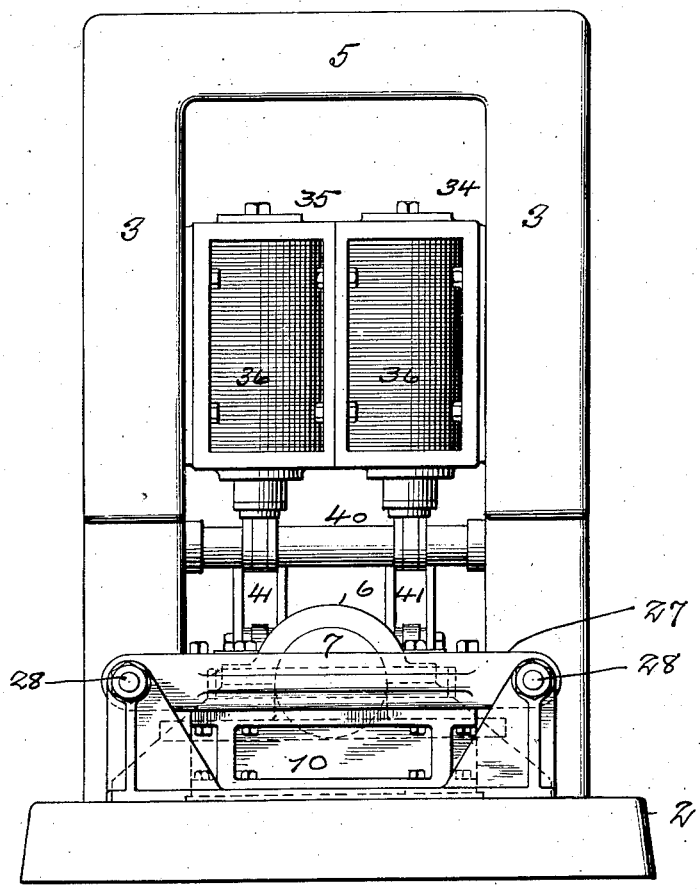
Figure 8:
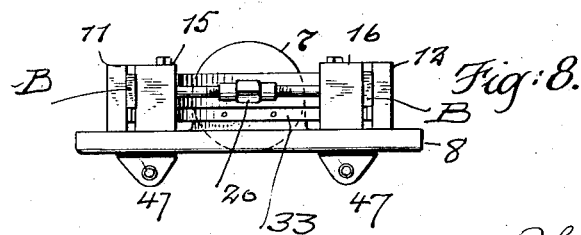

Figure 1 is a vertical section of our welding machine on the line 1, 1 of Fig. 3, showing the position of the parts before the welding operation. Fig. 2 is a front elevation. Fig. 3 is a plan view, showing the standards and toggle connection in horizontal section. Fig. 4 is a section on the line 4, 4 of Fig. 3. Fig. 5 is a sectional view, similar to Fig. 1, showing the position of the parts during the welding operation. Figs. 6 and 7 are enlarged plan views of the electrodes and supports, the ring sections being shown in place. In Fig. 6 the parts are shown before, and, Fig. 7, after the weld is made. Fig. 8 is an edge elevation of movable support and clamping electrode thereon.

Similar letters and numbers of reference indicate like parts.

On the bed 2 of the machine are mounted two hollow standards 3, connected at the top by an integral hollow cross beam 5. Upon the bed 2 and insulated therefrom is bolted a bracket 6 having a cylindrical opening, in which slides a solid cylinder 7, which is integral with the horizontal transverse table 8. A guide key 9 enters longitudinal grooves in said cylinder and said bracket.

Disposed upon bed 2 in front of table 8 is a fixed support 10. Movable table 8 carries one welding electrode, and fixed support 10 carries the other welding electrode.

Upon the table 8 are bolted two copper blocks 11, 12, and upon support 10 are bolted two similar copper blocks 13, 14. Upon the table 8 are two movable copper blocks 15, 16 which are secured to said table by bolts passing through slots in said blocks. Upon the support 10 are two movable copper blocks 17, 18, similar to blocks 15, 16, and secured in like manner to said support by bolts passing through slots in said blocks. The movable blocks 15, 16 are connected by threaded pins 19 and a nut 20. The movable blocks 17, 18 are similarly connected by threaded pins 21 and a nut 22. The opposing faces of the movable blocks 15, 16, 17, 18 and of the fixed blocks 11, 12, 13, 14 are arc-shaped and struck from the same center. When the movable blocks are moved toward or from the fixed blocks, the spaces between said movable and fixed blocks are decreased or increased. Consequently when the two half ring sections A, B, to be welded at their ends to form a ring are placed respectively between the movable and fixed blocks on table 8, which blocks 11, 12, 15, 16 then form unitedly one welding electrode, and between the movable and fixed blocks 13, 14, 17, 18 on support 10, which blocks then unitedly form the opposite welding electrode, said sections are clamped in place by setting out the movable blocks by means of the nuts 20, 22.

The front face of the cylinder 6 on table 8 is recessed at 23, Figs. 6 and 7, to receive the ring section B. Above the support 10 is a plate 24 which is recessed at 25 to receive the ring section A, and on each side of said recess are notches to receive the fixed copper blocks 13, 14. On the ends of plate 24 are sleeves 26, Fig. 3, and on the front portion of bed 2 is a fixed bracket 27. Headed stay-bolts 28 pass through lugs on bracket 27, sleeves 26, standards 3 and a beam 29 which is bolted on the rear side of said standards, and are set up by nuts 30. Washers 31 are interposed between bracket 27 and sleeves 26. The sleeves 26 are insulated from stay-rods 28 by insulating bushings 32.

The ring sections A, B, when in place, rest upon curved strips 33 secured at the bottom of the curved recesses in the front side of cylinder 7 and in plate 24, Fig. 1.

Ring section B is moved toward and from ring section A by the following mechanism:

34 and 35, Figs. 4 and 5, are frames disposed between the standards 3 and bolted to one another and to said standards. Electro-magnets 36, connected to any suitable source of direct current, are supported in said frames. Each magnet has a fixed core 37 secured to the upper member of its frame, and a movable core 38 extending through an opening in the lower member of its frame. The movable magnet cores 38 have lugs at their ends which are pivoted between the long arms of pairs of toggle levers 39. Said levers are all pivoted on a cross shaft 40 extending between the standards 3, and at their short arms are pivoted to links 41, which in turn are pivoted to the knuckles of pairs of toggle levers 42, 43. Toggle levers 42 are pivoted to lugs on cylinder 7. Toggle levers 43 are pivoted to lugs 44 on the front side of the cross beam 29 on the rear side of standards 3.

On the rear side of support 10 are fixed horizontal pins 46, and on the under side of table 8 and insulated therefrom are sleeves 47 receiving said pins. The sleeves 47 serve as stops which on striking the rear side of support 10 limit the movement of table 8 toward said support, and the pins coöperating with said sleeves form guides for keeping the abutting ends of the ring sections in alinement during the said movement.

The operation is as follows:

The ring sections A, B are placed respectively upon the table 8 and support 10, with their ends in contact, and are clamped in place between the movable and fixed copper blocks forming electrodes, as described. Circuit being closed by switch 48, Fig. 1, to the primary of transformer T, welding current is established from the secondary of said transformer to the clamping electrodes, thus heating the contacting ends of the ring sections allowed for take-up, which ends protrude beyond said electrodes, and rendering the same plastic. Electromagnets 36, being as before stated in direct current circuit, becoming energized, operate through the described toggle mechanism to press the ring section B against ring section A, thus compressing and uniting the plastic ends of said sections, and so producing a truly circular welded ring.

We claim:

1. An electric welding machine, comprising electrodes having semi-circular recesses for the reception of semi-circular sections of the work, means disposed and operating within said recesses for preventing rotation of said sections in said recesses.

2. An electric welding machine for uniting sections of a ring or other endless shape, comprising a fixed electrode and a movable electrode, each electrode having a recess wherein the sections to be welded are seated, and means on said electrodes and within said recesses for clamping said sections in said recesses.

3. In combination with the electrodes of an electric welding machine for uniting the abutting ends of two sections of a ring or other endless shape, fixed abutments on each of said electrodes receiving said sections between them, and outwardly movable means on said electrodes for clamping said sections against said abutments.

4. In combination with the electrodes of an electric welding machine for uniting the abutting ends of two sections of a ring or other endless shape, two fixed blocks on each electrode, each block having a concavity conforming to the shape of the work, two movable blocks, each having a convexity conforming to the shape of the work, and means for moving said movable blocks simultaneously to clamp said sections between said movable blocks and said fixed blocks.

5. An electric welding machine for uniting sections of a ring or other endless shape, comprising a support, an electrode thereon, a fixed guide sleeve on said support, a movable electrode having a projection slidable in said sleeve, clamping members for said sections on said electrodes, and a toggle mechanism connected to said projection for operating said movable electrode.

6. An electric welding machine for uniting the abutting ends of two sections of a ring or other endless shape, comprising a fixed support, a clamping electrode for one of said sections thereon, a movable support, a clamping electrode for the other of said sections thereon, means for establishing welding current to said electrodes, and electrode-magnetic means for moving said movable support to press together said abutting ends.

7. An electric welding machine, as in claim 6, and a toggle mechanism interposed between said movable support and a fixed support, and operated by said electro-magnetic means for the purpose set forth.

In testimony whereof we have affixed our signatures in presence of two witnesses.

THOMAS E. MURRAY.
HARRY R. WOODROW.

Witnesses:
GERTRUDE T. PORTER,
MAY T. MCGARRY.